United States Patent
Paczkowski et al.

(10) Patent No.: US 11,463,856 B1
(45) Date of Patent: Oct. 4, 2022

(54) UPLINK DATA BURST IN A WIRELESS COMMUNICATION NETWORK

(71) Applicant: T-MOBILE INNOVATIONS LLC, Overland Park, KS (US)

(72) Inventors: Lyle Walter Paczkowski, Mission Hills, KS (US); Lyle T. Bertz, Lee's Summit, MO (US); Galip Murat Karabulut, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 39 days.

(21) Appl. No.: 17/143,471

(22) Filed: Jan. 7, 2021

(51) Int. Cl.
| | |
|---|---|
| *H04B 7/00* | (2006.01) |
| *H04W 4/00* | (2018.01) |
| *G06F 15/16* | (2006.01) |
| *H04M 3/493* | (2006.01) |
| *G06F 9/44* | (2018.01) |
| *H04W 4/70* | (2018.01) |
| *H04W 76/12* | (2018.01) |

(52) U.S. Cl.
CPC ............. *H04W 4/70* (2018.02); *H04W 76/12* (2018.02)

(58) Field of Classification Search
CPC ................................ H04W 4/70; H04W 76/12
USPC ........................................................ 370/310
See application file for complete search history.

(56) References Cited

U.S. PATENT DOCUMENTS

| | | | |
|---|---|---|---|
| 10,165,538 B1 * | 12/2018 | Fang | H04W 76/16 |
| 10,531,420 B2 | 1/2020 | Li et al. | |
| 10,716,096 B2 | 7/2020 | Yu et al. | |
| 10,812,629 B2 | 10/2020 | Park et al. | |
| 2017/0317894 A1 | 11/2017 | Dao et al. | |
| 2017/0332421 A1 | 11/2017 | Sternberg et al. | |
| 2018/0262924 A1 | 9/2018 | Dao et al. | |
| 2018/0262967 A1 * | 9/2018 | Shiragaki | H04L 67/327 |
| 2019/0007329 A1 * | 1/2019 | Velev | H04L 47/25 |
| 2019/0166016 A1 * | 5/2019 | Livanos | H04L 67/322 |
| 2020/0287975 A1 * | 9/2020 | Li | H04L 67/146 |
| 2020/0314760 A1 | 10/2020 | Ye et al. | |
| 2021/0004222 A1 * | 1/2021 | Huang | G06F 8/654 |
| 2021/0144517 A1 * | 5/2021 | Guim Bernat | G06F 9/4881 |
| 2021/0352046 A1 * | 11/2021 | Huang | H04W 12/088 |

* cited by examiner

*Primary Examiner* — Mark G. Pannell

(57) ABSTRACT

In a wireless communication system, a controller network element establishes a data tunnel between a wireless user device and an application server. An exposure network element receives an uplink QoS level and a cost, and the exposure network element indicates the uplink QoS level to a policy network element and indicates the service cost to a charging network element. The policy network element indicates related tunnel instructions to the controller network element. The charging network element indicates related quota instructions to the controller network element. The controller network element directs the data network element to transfer application data over the data tunnel using the uplink QoS level. The data network element transfers the application data over the data tunnel from the wireless user device to the application server at the uplink QoS level.

20 Claims, 9 Drawing Sheets

UPLINK DATA BURST IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless network cores comprise various network elements. Data network elements transfer user data per Quality-of-Service (QoS) levels and consume network resources per data quotas. Exemplary data network elements comprise User Plane Functions (UPFs) and data Gateways (GWs). Controller network elements manage the QoS and report on quota consumption. Exemplary controller network elements comprise Access and Mobility Management Functions (AMFs), Mobility Management Entities (MMEs), and Session Management Functions (SMFs). Policy network elements and charging network elements manage QoS and quotas. Exemplary policy and charging network elements comprise Policy Control Functions (PCFs) and Charging Functions (CHFs). Exposure network elements interact with third-party data systems to serve user reporting and exert user control. Exemplary exposure network elements comprise Service Capability Exposure Functions (SCEFs) and Network Exposure Functions (NEFs). Unfortunately, the exposure network elements are not optimized to drive the policy and charging network elements to dynamically deliver user-selected QoS at user-selected costs.

TECHNICAL OVERVIEW

In a wireless communication system, a controller network element establishes a data tunnel between a wireless user device and an application server. An exposure network element receives an uplink QoS level and a cost, and the exposure network element indicates the uplink QoS level to a policy network element and indicates the service cost to a charging network element. The policy network element indicates related tunnel instructions to the controller network element. The charging network element indicates related quota instructions to the controller network element. The controller network element directs the data network element to transfer application data over the data tunnel using the uplink QoS level. The data network element transfers the application data over the data tunnel from the wireless user device to the application server at the uplink QoS level.

DETAILED DESCRIPTION

Figure 1:
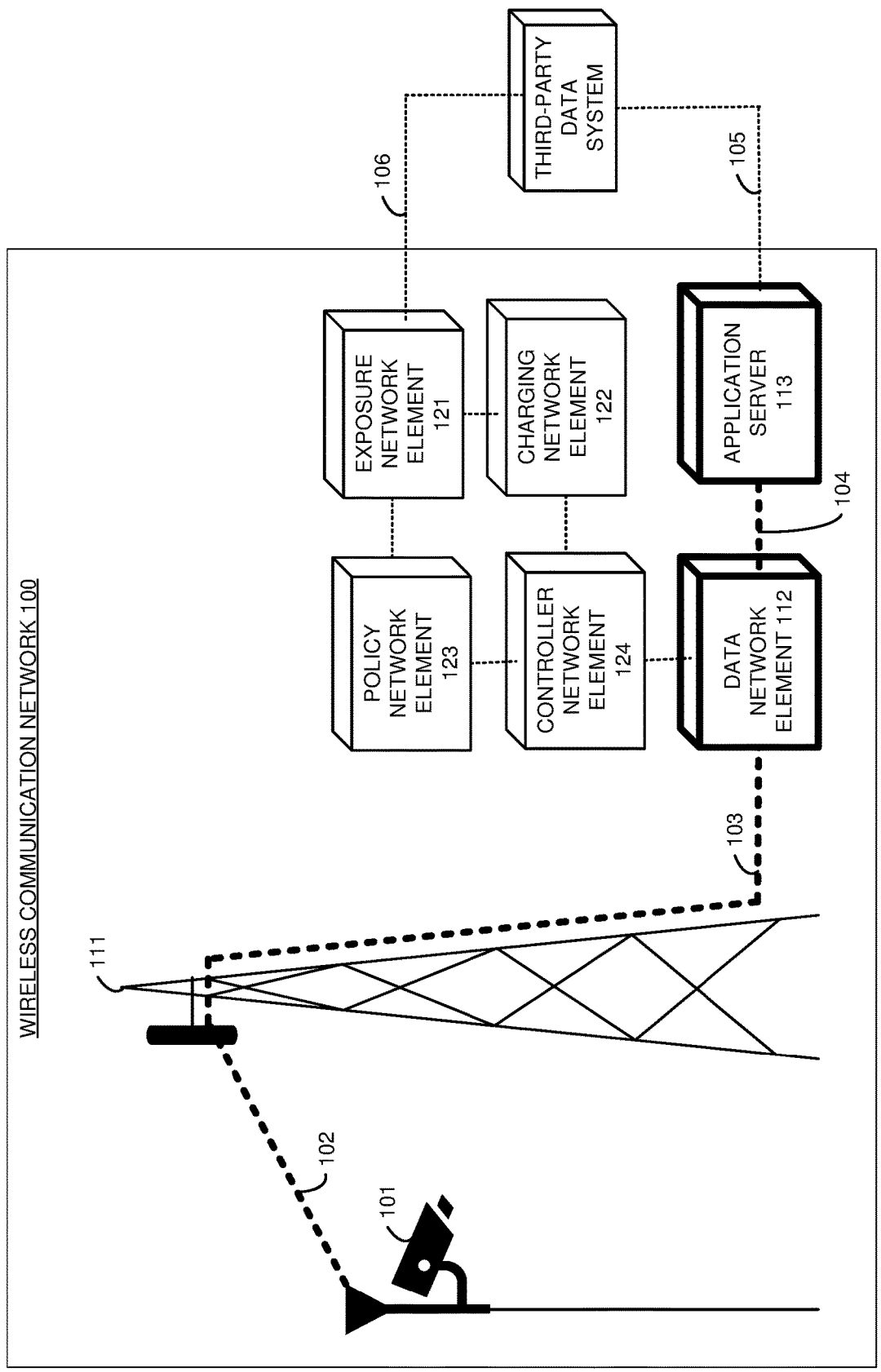
FIG. 1 illustrates a wireless communication network to deliver an uplink data service to a user application.

FIG. 1 illustrates wireless communication network 100 to deliver an uplink data service to a user application. Wireless communication network 100 comprises wireless UE 101, Radio Access Network (RAN) 111, data network element 112, application server 113, exposure network element 121, charging network element 122, policy network element 123, and controller network element 124. The number of UEs, RANs, network elements, and servers that are depicted on FIG. 1 has been restricted for clarity, and wireless communication network 100 may comprise many more UEs, RANs, network elements, and servers.

Various examples of network operation and configuration are described herein. In some examples, controller network element 124 exchanges signaling with wireless UE 101 over RAN 111, and in response, controller network element 124 establishes a data tunnel between wireless UE 101 and application server 113 that traverses: wireless link 102, RAN 111, backhaul link 103, data network element 112, and data link 104. Exposure network element 121 transfers uplink Quality-of-Service (QoS) levels and corresponding service costs for the data tunnel to a third-party data system. Exposure network element 121 receives a selection of one of the uplink QoS levels and one of the service costs from the third-party data system—and the selected uplink QoS level may comprise an uplink data burst. Exposure network element 121 indicates the selected uplink QoS level to policy network element 123. Exposure network element 121 indicates the selected service cost to charging network element 122. Policy network element 123 receives the uplink QoS level indication and indicates related tunnel instructions to controller network element 124. Charging network element 122 receives the service cost indication and indicates related quota instructions to controller network element 124. In response, controller network element 124 directs RAN 111 and data network element 112 to transfer application data over the data tunnel using the selected uplink QoS level. Wireless UE 101 wirelessly transfers the application data over the data tunnel to RAN 111 using the selected uplink QoS level. RAN 111 transfers the application data over the data tunnel to data network element 112 using the selected uplink QoS level. Data network element 112 transfers the application data over the data tunnel to application server 113 using the selected uplink QoS level. As a result, data network element 112 consumes the quota amount indicated in the quota instruction. Bursts of downlink QoS could be delivered over the data tunnel in a similar manner. Advantageously, exposure network element 121 efficiently and effectively drives charging network element 122 and policy network element 123 to dynamically deliver user-selected QoS at user-selects costs.

Exposure network element 121 comprises a Network Exposure Function (NEF), Service Capability Exposure Function (SCEF), and/or some other user-interface network element. In some examples, exposure network element 121 exchanges QoS and cost data with the third-party data system by exposing third-party Application Programming Interfaces (APIs) to the third-party data system. Hardware-trust entails the use of cryptography to remotely verify secret identity codes that are physically embedded in read-only memories along the data tunnel. In some examples, the third-party APIs presented by exposure network function 121 allow the third-party data system to maintain tunnel hardware-trust along with the data tunnel along with controlling with tunnel QoS and cost.

Data network element 112 comprises a User Plane Function (UPF), Serving Gateway (SGW), and Packet Data Network Gateway (PGW), System Architecture Evolution Gateway (SAE GW), and/or some other user-plane element. In some examples, data network element 112 comprises a portion of a Machine Type Communication (MTC) wireless network slice. Controller network element 124 comprises an Access and Mobility Management Function (AMF), Session Management Function (SMF), Mobility Management Entity (MME), and/or some other control-plane element. Policy network element 123 comprises a Policy Control Function (PCF), Policy, Charging, and Rules Function (PCRF), and/or some other policy element. Charging network element 122 comprises a Charging Function (CHF), Account Balance Management Function (ABMF), Charging Gateway Function (CGF), Rating Function (RF), and/or some other accounting element.

Wireless UE 101 and RAN 111 wirelessly communicate over wireless links 102 using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RAN 111 communicates with data network element 112 over backhaul links 103. Data network element 112 communicates with application server 113 over data link 104. Data network element 112 and application server 113 may be co-located in an edge data center and data link 104 may be virtualized. Application server 113 may communicate with the third-party data system over external link 105. Data links 103-105 use metal, glass, air, or some other media. Data links 103-105 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UE 101 is depicted as a security camera, UE 101 might instead comprise a meter, sensor, robot, computer, phone, or some other data appliance with wireless communication circuitry. RAN 111 is depicted as a tower but RAN 111 may use other mounting structures or no mounting structure at all. RAN 111 may comprise gNodeBs, eNodeBs, NB-IoT access nodes, LP-WAN base stations, wireless relays, and/or some other wireless network transceivers. Wireless UE 101 and RAN 111 comprise antennas, amplifiers, filters, modulation, and analog/digital interfaces. UE 101, RAN 111, and network elements 112-113 and 121-124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
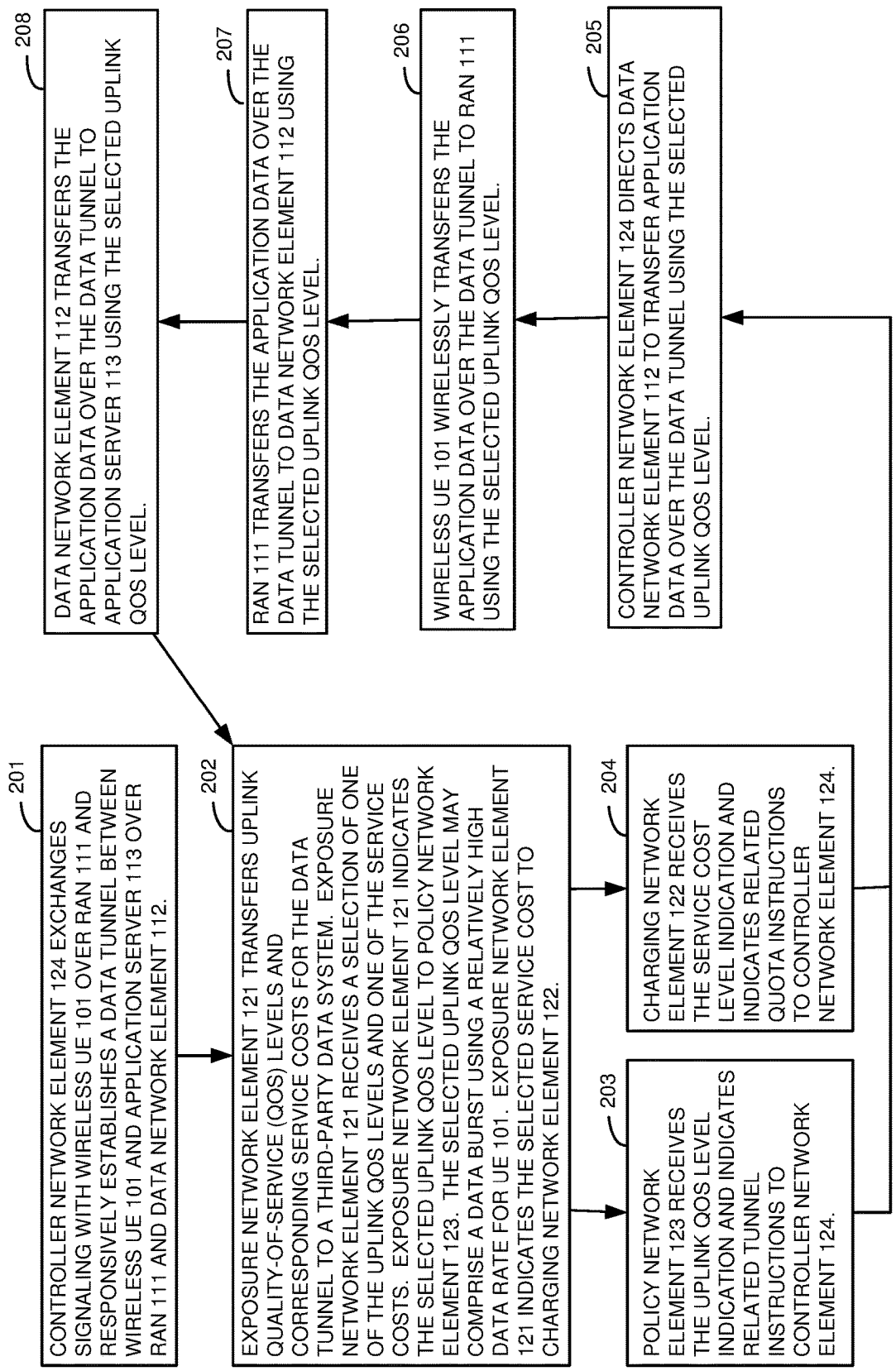
FIG. 2 illustrates the operation of the wireless communication network to deliver the uplink data service to the user application.

FIG. 2 illustrates the operation of the wireless communication network to deliver the uplink data service to the user application. The operation is exemplary and may differ in other examples. Controller network element 124 exchanges signaling with wireless UE 101 over RAN 111 and responsively establishes a data tunnel between wireless UE 101 and application server 113 over RAN 111 and data network element 112 (201). Exposure network element 121 transfers uplink QoS levels and corresponding service costs for the data tunnel to a third-party data system (202). Exposure network element 121 receives a selection of one of the uplink QoS levels and one of the service costs from the third-party data system (202). Exposure network element 121 indicates the selected uplink QoS level to policy network element 123 (202). The selected uplink QoS level may comprise a data burst using a relatively high data rate for UE 101. Exposure network element 121 indicates the selected service cost to charging network element 122 (202). Policy network element 123 receives the uplink QoS level indication and indicates related tunnel instructions to controller network element 124 (203). Charging network element 122 receives the service cost level indication and indicates related quota instructions to controller network element 124 (204). Controller network element 124 directs data network element 112 to transfer application data over the data tunnel using the selected uplink QoS level (205). Wireless UE 101 wirelessly transfers the application data over the data tunnel to RAN 111 using the selected uplink QoS level (206). RAN 111 transfers the application data over the data tunnel to data network element 112 using the selected uplink QoS level (207). Data network element 112 transfers the application data over the data tunnel to application server 113 using the selected uplink QoS level (208). As a result, data network element 112 consumes the quota amount indicated in the quota instruction. The operation repeats (202), and the user may control downlink QoS in a similar manner.

Figure 3:
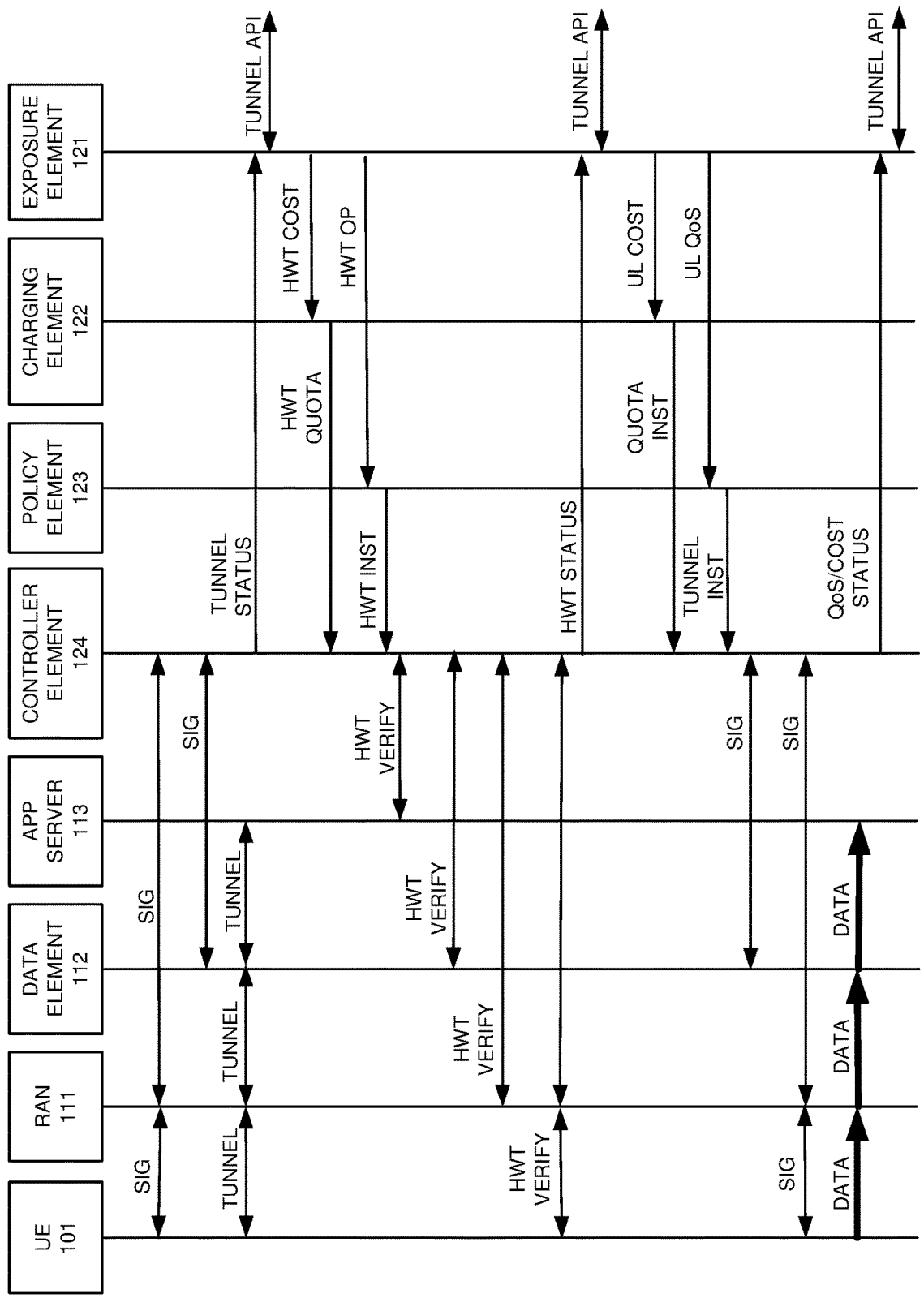
FIG. 3 illustrates the operation of the wireless communication network to deliver the uplink data service to the user application.

FIG. 3 illustrates the operation of the wireless communication network to deliver the uplink data service to the user application. The operation is exemplary and may differ in other examples. UE 101 wirelessly attaches to RAN 111 and they exchange attachment signaling (SIG). In response, RAN 111 and controller network element 124 exchange attachment signaling for UE 101. Controller network element 124 exchanges authentication signaling with wireless UE 101 over RAN 111, and in response, controller network element 124 establishes a default data tunnel between wireless UE 101 and application server 113 that traverses RAN 111 and data network element 112. The default data tunnel has a best-effort QoS. Controller network element 124 transfers tunnel status data that identifies UE 101 and the default tunnel to exposure element 121. Over the tunnel API, exposure network element 121 transfers the tunnel status data to the third-party data system along with options for tunnel Hardware Trust (HWT), QoS, and cost.

Over the tunnel API, exposure network element 121 receives a selection of a HWT operation and an associated HWT cost. The HWT operation is to verify HWT of the default data tunnel. Exposure network element 121 transfers the selected HWT cost to charging element 122. Charging network element 122 translates the HWT cost into a corresponding quota instruction and transfers the HWT quota instruction to controller network element 124. Exposure network element 121 transfers the HWT operation to policy element 123. Policy network element 123 translates the HWT operation into a corresponding HWT instruction and transfers the HWT instruction to controller network element 124. In response to the quota instruction and the HWT instruction, controller network element 124 verifies HWT for APP server 113, data network element 112, RAN 111, and UE 101. In some examples, controller network element 124 requests current HWT certificates from APP server 113, data network element 112, RAN 111, and UE 101. To obtain certificates, APP server 113, data network element 112, RAN 111, and UE 101 transfer a hash of their secret HWT ID to a HWT authority that verifies the hashes and returns current HWT certificates to APP server 113, data network element 112, RAN 111, and UE 101. Controller network element 124 then receives the current HWT certificates from APP server 113, data network element 112, RAN 111, and UE 101. Controller network element 124 validates the HWT certificates using a key from the HWT authority. As a result, controller network element 124 consumes the quota amount indicated in the quota instruction. Controller network element 124 transfers HWT status to exposure network element 121 which passes this HWT status over the tunnel API.

Over the tunnel API, exposure network element 121 receives a selection of an uplink QoS operation and an associated QoS cost. The uplink QoS operation is a heavy data burst from UE 101 to app server 113. Exposure network element 121 transfers the QoS cost to charging network element 122. Charging network element 122 translates the QoS cost into a corresponding quota instruction and transfers the quota instruction to controller network element 124. Exposure network element 121 transfers the QoS operation to policy element 123. Policy network element 123 translates the QoS operation into a corresponding tunnel instruction and transfers the tunnel instruction to controller network element 124. In response to the quota instruction and the tunnel instruction, controller network element 124 transfers signaling to data network element 112 and RAN 111 to implement the uplink QoS. RAN wirelessly signals UE 101 to implement the uplink QoS. UE 101 wirelessly bursts application data to RAN 111 per the uplink QoS. RAN 111 bursts the application data to data network element 112 per the uplink QoS. Data network element 112 bursts the application data to app server 113 per the uplink QoS. As a result, data network element 112 consumes the quota amount indicated in the quota instruction. Controller network element 124 transfers tunnel status to exposure network element 121 which passes QoS and cost status over the tunnel API.

Figure 4:
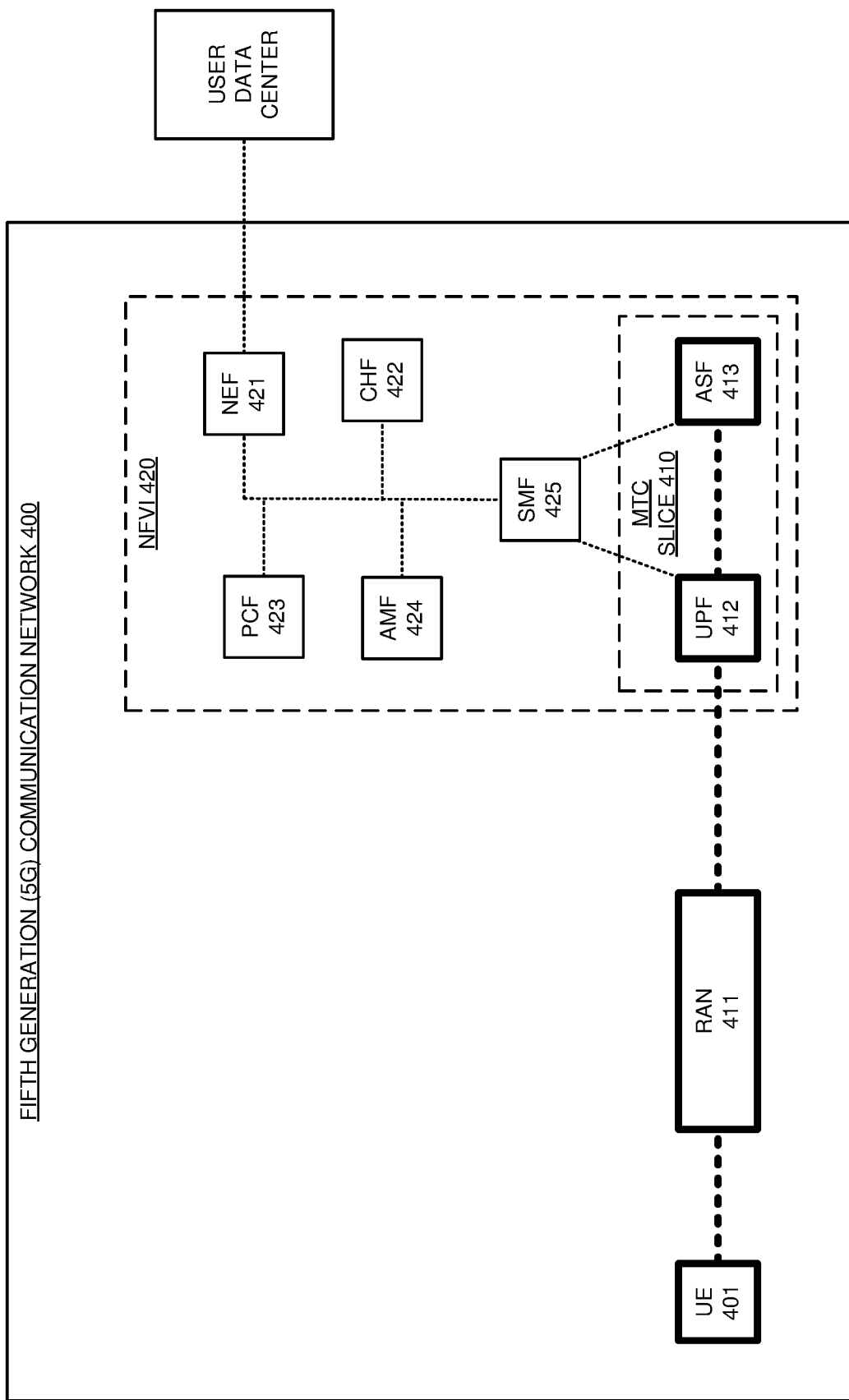
FIG. 4 illustrates a Fifth Generation (5G) network to deliver an uplink burst service to wireless User Equipment (UE) over a Machine Type Communication (MTC) network slice.

FIG. 4 illustrates Fifth Generation (5G) network 400 to deliver an uplink burst service to wireless User Equipment (UE) 401 over Machine Type Communication (MTC) network slice 410. 5G network 400 comprises UE 401, RAN 411, and Network Function Virtualization Infrastructure (NFVI) 420. NFVI 420 comprises MTC network slice 410, Network Exposure Function (NEF) 421, Charging Function (CHF) 422, Policy Control Function (PCF) 423, Access and Mobility Management Function (AMF) 424, and Session Management Function (SMF) 425. MTC network slice 410 comprises User Plane Function UPF 412 and Application Server Function (ASF) 413. NFVI 420 is typically distributed and MTC slice 410 resides in an edge portion of NFVI 420 that may be co-located with a portion of RAN 411.

UE 401 and RAN 111 wirelessly exchange attachment signaling and UE 401 reports a UE capability for MTC network slices. RAN 111 and AMF 424 exchange attachment signaling for UE 401. AMF 424 interacts with an Authentication Server Function (AUSF) to authenticate wireless UE 401 over RAN 411. AMF 424 interacts with a Network Slice Selection Function (NSSF) to select MTC network slice 410 for UE 401 based on the reported UE slice capability. AMF 424 interacts with a UDM to select a Dynamic Network Name (DNN) for UE 401 based on MTC network slice 410. AMF 424 selects SMF 425 based on the DNN and MTC network slice 410. SMF 425 interacts with a Network Repository Function (NRF) to select CHF 422 and PCF 423 for UE 401 based on the DNN and MTC network slice 410. SMF 425 interacts with the NRF to select UPF 412 and ASF 413 for UE 401 based on the DNN and MTC network slice 410. PCF 423 initially orders a data tunnel using a default non-Guaranteed Bit Rate (non-GBR) for UE 401 based on the DNN and MTC network slice 410. SMF 425 directs UPF 412 and ASF 413 to serve the default data tunnel for UE 401 between RAN 411 and ASF 413 using the non-GBR QoS. AMF 424 directs RAN 411 to serve the default data tunnel between UE 401 and UPF 412 using the non-GBR QoS. RAN 411 directs UE 401 to use the default data tunnel to ASF 413 using the non-GBR QoS.

SMF 425 transfers tunnel status data that identifies UE 401 and the default tunnel status to NEF 421. Over a tunnel API, NEF 421 transfers the tunnel status data to the user data center along with options for tunnel HWT, QoS, and cost. Over the tunnel API, NEF 421 receives a selection of a HWT operation and an associated HWT cost. The HWT operation is to verify HWT of the default data tunnel. NEF 421 transfers the HWT cost to CHF 422. CHF 422 translates the HWT cost into a corresponding quota instructions and transfers the quota instructions to AMF 424. NEF 421 transfers the HWT operation to PCF 423. PCF 423 translates the HWT operation into a corresponding HWT instruction and transfers the HWT instruction to AMF 424. In response to the quota and HWT instructions, AMF 424 verifies HWT for ASF 413, UPF 412, RAN 411, and UE 401. To validate HWT, AMF 424 requests current HWT certificates from ASF 413, UPF 412, RAN 411, and UE 401. To obtain certificates, ASF 413, UPF 412, RAN 411, and UE 401 transfer hashes of their secret HWT IDs to a HWT authority (not shown) that verifies the hashes and returns current HWT certificates to ASF 413, UPF 412, RAN 411, and UE 401. AMF 424 then receives the current HWT certificates from ASF 413, UPF 412, RAN 411, and UE 401. The HWT certificates are digitally signed by the HWT authority, and AMF 424 validates the HWT certificates using a key from the HWT authority to decrypt the certificates. AMF 424 notifies CHF 422 of the HWT operation, and CHF 422 debits the HWT quota by the consumed amount. AMF 424 transfers HWT status to NEF 421 which passes the HWT status to the user data center over the tunnel API.

Over the tunnel API, NEF 421 receives a selection of an uplink QoS operation and an associated QoS cost. The uplink QoS operation is a heavy data burst from UE 401 to ASF 413. NEF 421 transfers the uplink QoS cost to CHF 422 which translates the QoS cost into a corresponding quota instruction and transfers the quota instruction to SMF 425. NEF 421 transfers the QoS operation to PCF 423 which translates the QoS operation into a corresponding tunnel instruction and transfers the tunnel instruction to SMF 425. PCF 423 now orders the data tunnel to use a special burst Guaranteed Bit Rate (GBR). SMF 425 directs UPF 412 to serve the default data tunnel for UE 401 between RAN 411 and ASF 413 using the burst GBR QoS. AMF 424 directs RAN 411 to serve the default data tunnel for UE 401 between UE 401 and UPF 412 using the burst GBR QoS. RAN 411 directs UE 401 to use the default data tunnel to ASF 413 using the burst GBR QoS. UE 401 wirelessly transfers application data to RAN 411 using the burst GBR QoS. RAN 411 transfers the application data to UPF 412 in MTC network slice 410 using the burst GBR QoS. In MTC network slice 410, UPF 412 transfers the application data to ASF 413 using the burst GBR QoS. SMF 425 debits the quota for consumed resources. SMF 425 transfers QoS status that characterizes the burst to NEF 421 which passes the QoS status to the user data center over the tunnel API.

Figure 5:
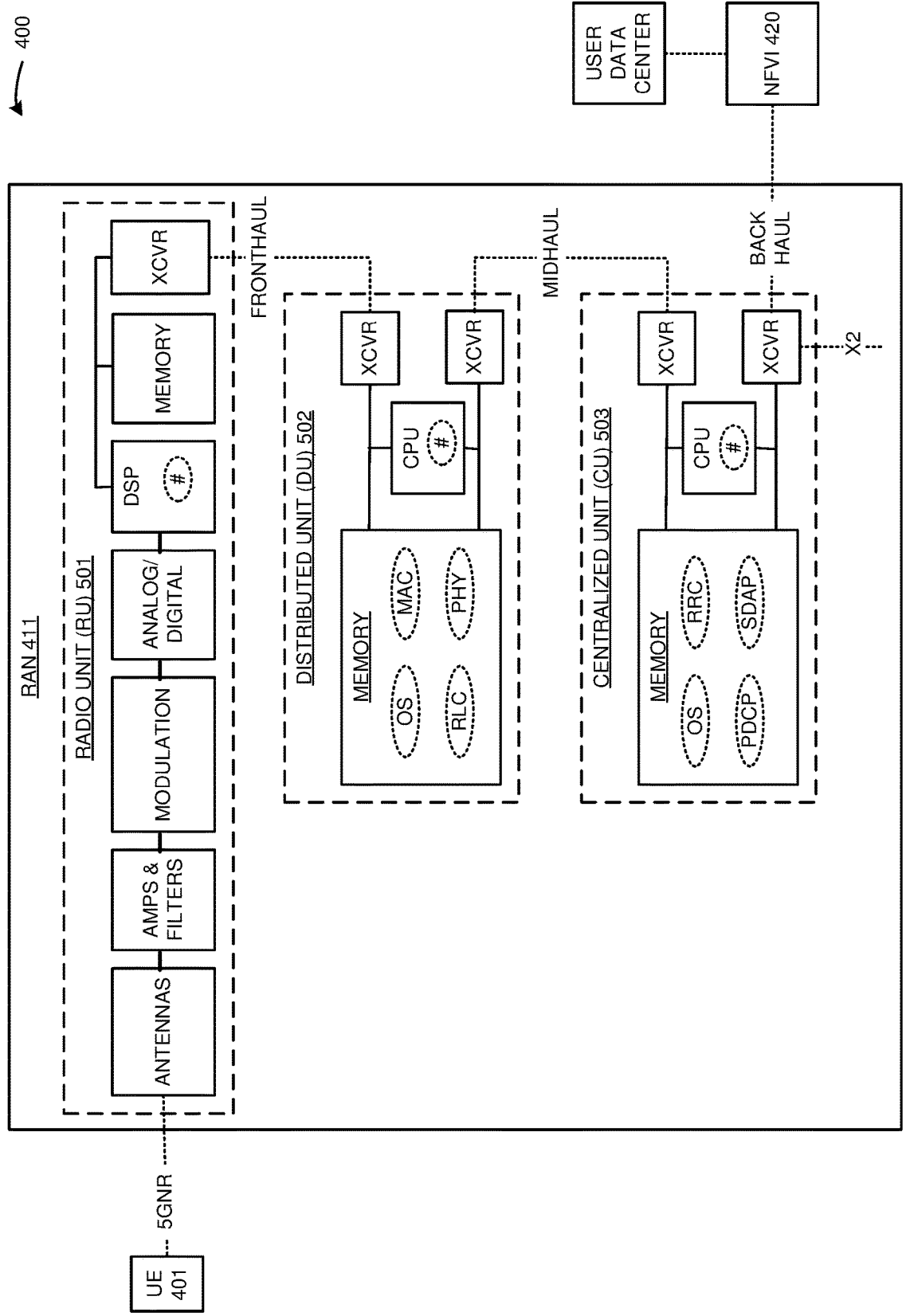
FIG. 5 illustrates a Radio Access Network (RAN) to deliver the uplink burst service to the wireless UE over the MTC network slice.

FIG. 5 illustrates Radio Access Network (RAN) 411 to deliver the uplink burst service to wireless UE 401 over MTC network slice 410. RAN 411 comprises an example of RAN 111, although RAN 111 may differ. RAN 411 comprises Radio Unit (RU) 501, Distributed Unit (DU) 502, and Centralized Unit (CU) 503. RU 501 comprises antennas, amplifiers, filters, modulation, analog-to-digital interfaces, DSP, memory, and transceivers (XCVRs) that are coupled over bus circuitry. DU 502 comprises memory, CPU, and transceivers that are coupled over bus circuitry. The memory in DU 502 stores an operating system and 5GNR network applications like Physical Layer (PHY), Media Access Control (MAC), and Radio Link Control (RLC). CU 503 comprises memory, CPU, and transceivers that are coupled over bus circuitry. The memory in CU 503 stores an operating system and network functions like Packet Data Convergence Protocol (PDCP), Service Data Adaptation Protocol (SDAP), and Radio Resource Control (RRC).

In DU 502, RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). In CU 503, PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

UE 401 is wirelessly coupled to the antennas in RU 501 over 5GNR links. Transceivers in RU 501 are coupled to transceivers in DU 502 over fronthaul links like enhanced Common Public Radio Interface (eCPRI). Transceivers in DU 502 are coupled to transceivers in CU 503 over mid-haul links. Transceivers in CU 503 are coupled to network core NFVI 420 over backhaul links. The CPUs in DU 502 and CU 503 execute their operating systems, PHY, MAC, RLC, PDCP, SDAP, and RRC to exchange 5GNR signals with UE 401 over RU 412 and to exchange 5GC/X2 signaling and data with NFVI 420 and other CUs.

In RU 501, the antennas receive wireless 5GNR signals from UE 401 that transport uplink 5GNR signaling and data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals and transfer the uplink 5GNR symbols to DU 502. In DU 502, the CPU executes the network applications (PHY, MAC, and RLC) to process the uplink 5GNR symbols and recover the uplink 5GNR signaling and data. The RLC in DU 502 transfers UL data units to the PDCP in CU 503. In CU 503, the CPU executes the network function (PDCP, SDAP, and RRC) to process the uplink data units and recover the uplink 5GNR signaling and data. The RRC processes the uplink 5GNR signaling, downlink 5GC N2 signaling, and X2 signaling to generate new downlink 5GNR signaling, new uplink 5GC N2 signaling, and new X2 signaling. The RRC transfers the new uplink 5GC N2 signaling to NFVI 420 and the X2 signaling to other NodeBs. The SDAP transfers corresponding N3 data to UPF 412 in NFVI 420.

In CU 503, the RRC receives 5GC N2 signaling from AMF 424 in NFVI 420 and X2 signaling from the other CUs. The SDAP receives downlink data from UPF 512 in NFVI 420 and X2 data from other CUs. The 5GNR network applications (RRC, SDAP, PDCP) process the new downlink 5GC signaling and data to generate corresponding downlink data units. The PDCP in CU 503 transfers the downlink data units to the RLC in DU 502. The 5GNR network applications (RLC, MAC, PHY) in DU 502 process the downlink data units to generate corresponding 5GNR symbols. DU 502 transfers the downlink 5GNR symbols to RU 501. In RU 501, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

UE 401 and the RRC in CU 503 exchange attachment signaling and UE 401 reports a UE capability for MTC network slices. The RRC in RAN 411 and AMF 424 in NFVI 420 exchange attachment signaling for UE 401. AMF 424 directs the RRC in RAN 411 to serve the data tunnel between UE 401 and UPF 412 using a default non-GBR QFI. The RRC in RAN 411 directs the RRC in UE 401 to use the data tunnel to ASF 413 in NFVI 420 using the default non-GBR QFI. UE 401 and the SDAP in CU 503 exchange application data over the default data tunnel using the default non-GBR QFI. The SDAP in CU 503 and UPF 412 in NFVI 420 exchange the application data over the default data tunnel using the default non-GBR QFI.

The DSP and CPUs in RAN 411 store HWT IDs (designated by a # symbol in the dotted oval on the figures). The RRC in CU 503 exchanges HWT signaling between UE 401 and AMF 424 for UE HWT verification. The RRC in CU 503 also exchanges HWT signaling with AMF 424 for RAN HWT verification. To perform RAN HWT verification, the RRC in CU 503 receives a Random Number (RAND) and passes the RAND to the CPU in CU 503. The CPU retrieves and hashes its HWT ID with the RAND and returns the result to the RRC. The RRC transfers the result and RAND to a HWT authority—typically over the N1 to AMF 424. The HWT authority verifies the hash for the CPU in CU 503 by performing the same calculation. The HWT authority returns a current and signed HWT certificate to the RRC in CU 503—typically over the N1 to AMF 424. The RRC in CU 503 transfers the HWT certificate for CU 503 to AMF 424 in NFVI 420. The DSP in RU 501 and the CPU in DU 502 could perform HWT operations in a like manner. NFVI 420 may host the HWT authority AMF 424 subsequently directs the RRC in CU 503 to serve the data tunnel for UE 401 between UE 401 and UPF 412 using ab uplink burst GBR. The RRC in CU 503 directs the RRC in UE 401 to use the data tunnel to ASF 413 using the uplink burst GBR. UE 401 exchanges application data with the SDAP in CU 503 using the uplink burst GBR. The SDAP in CU 503 transfers the application data to UPF 412 in MTC network slice 410 in NFVI 420 using the uplink burst GBR.

Figure 6:
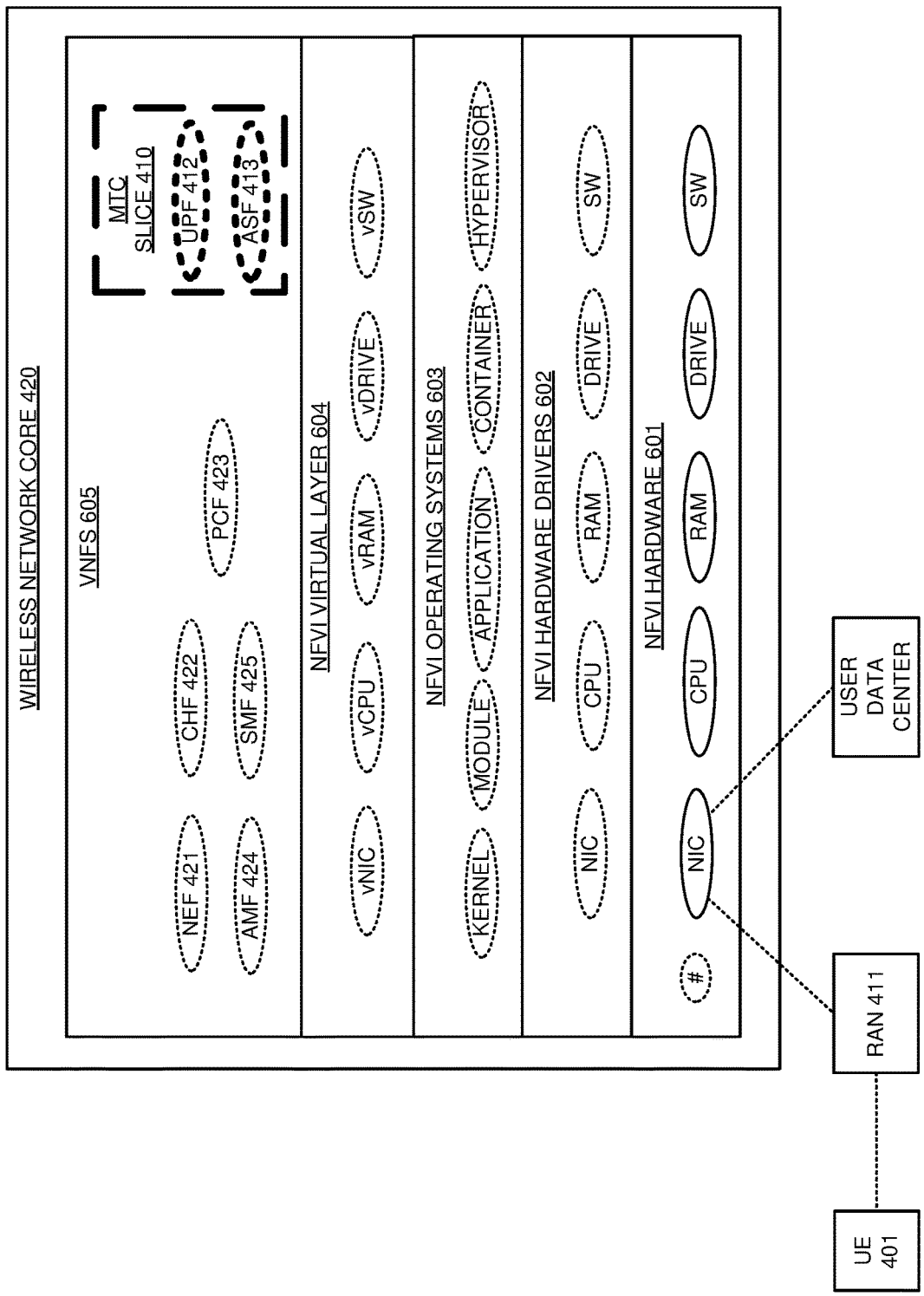
FIG. 6 illustrates Network Function Virtualization Infrastructure (NFVI) to deliver the uplink burst service to the wireless UE over the MTC network slice.

FIG. 6 illustrates Network Function Virtualization Infrastructure (NFVI) 420 to deliver the uplink burst service to wireless UE 401 over MTC network slice 410. NFVI 420 comprises an example of network elements 112-113 and 121-124, although network elements 112-113 and 121-124 may differ. NFVI 420 comprises NFVI hardware 601, NFVI hardware drivers 602, NFVI operating systems 603, NFVI virtual layer 604, and NFVI Virtual Network Functions (VNFs) 605. NFVI hardware 601 comprises Network Interface Cards (NICs), CPU, RAM, Flash/Disk Drives (DRIVE), and Data Switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises vNIC, vCPU, vRAM, vDRIVE, and vSW. NFVI VNFs 605 comprise User Plane Function (UPF) 412, Application Server Function (ASF) 413, Network Exposure Function (NEF) 421, Charging Function (CHF) 422, Policy Control Function (PCF) 423, Access and Mobility Management Function (AMF) 424, and Session Management Function (SMF) 425. Other VNFs like Authentication Server Function (AUSF), Unified Data Manager (UDM), Network Repository Function (NRF), Network Slice Selection Function (NSSF), are typically present but are omitted for clarity. NFVI 420 may be located at a single site or be distributed across multiple geographic locations. The NIC are coupled to CU 503 in RAN 411 and the user data center. NFVI hardware 601 executes NFVI hardware drivers 602, NFVI operating systems 603, NFVI virtual layer 604, and NFVI VNFs 605 to serve UE 401 over RAN 411. NFVI 420 exchanges 5GC signaling and data with CU 503 in RAN 411 to serve UE 401 with a wireless data tunnel.

Figure 7:
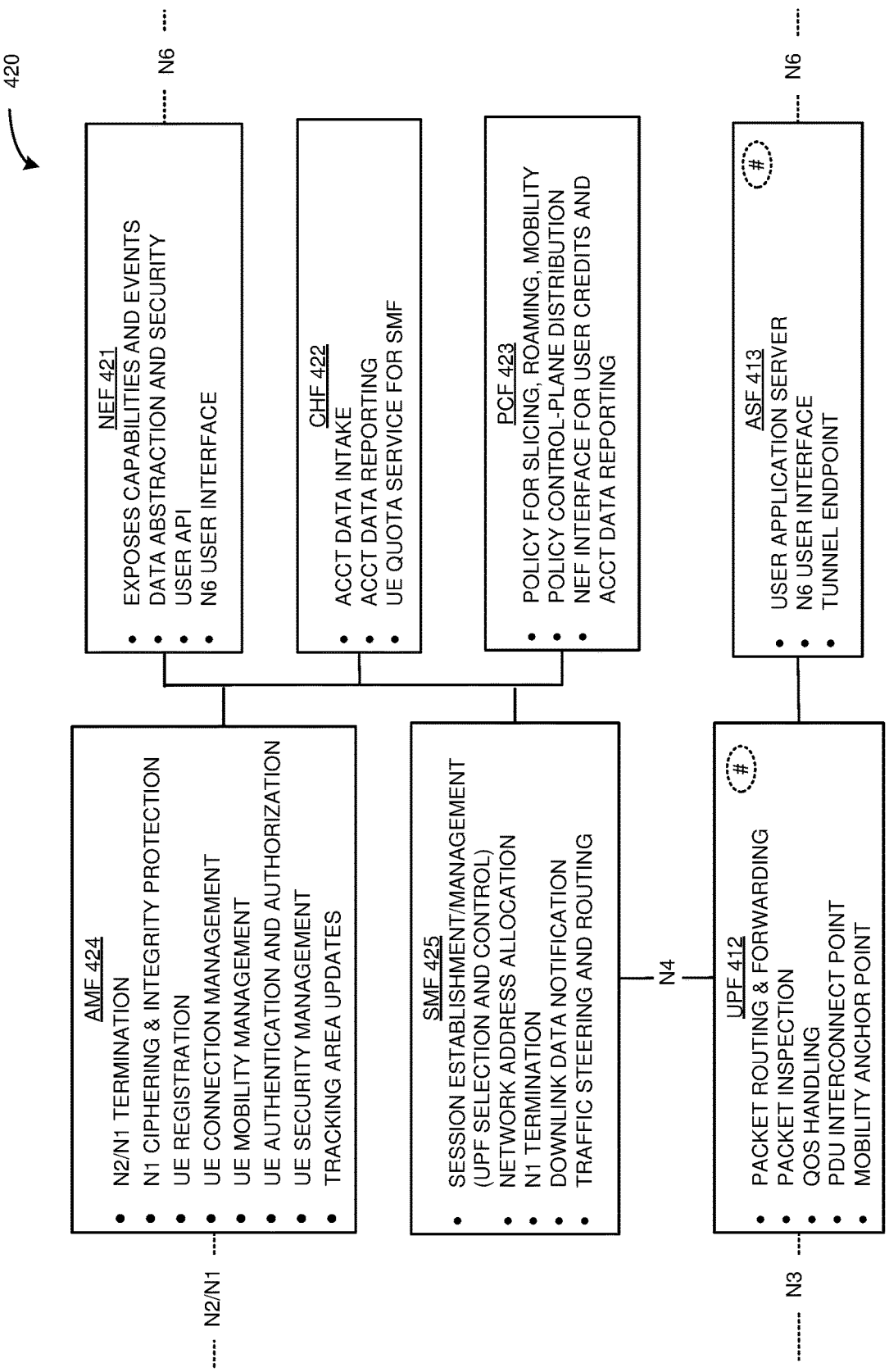
FIG. 7 illustrates the NFVI to deliver the uplink burst service to the wireless UE over the MTC network slice.

FIG. 7 illustrates NFVI 420 to deliver the uplink burst service to wireless UE 401 over MTC network slice 410. UPF 412 performs packet routing & forwarding, packet inspection, QoS handling, PDU interconnection, and mobility anchoring. ASF 413 performs N6 data tunnel termination, user application execution, N6 interconnection to the user data center. NEF 421 performs network topology exposure, network capability exposure, network event exposure, data abstraction and security, data tunnel APIs, and N6 termination. CITE 422 performs accounting data intake, accounting data reporting, UE quota handling, cost/quota translations, and NEF interactions. PCF 423 performs policy framework implementation for slices and mobility, policy control-plane distribution, QoS/instruction translations, and NRF interactions, AMF 424 performs N2/N1 termination, N1 ciphering & integrity protection, UE registration, SMF/PCF selection, UE connection/mobility management, UE authentication and authorization, UE security management, and tracking area updates. SMF 425 performs session establishment/management, network address allocation, N1 termination, downlink data notification, and traffic steering and routing. Although not shown for clarity, an AUSF performs UE authentication with Authentication and Key Agreement (AKA) credentials and handles UE authorizations. A UDM handles UE context. UE subscription data, and UE authentication keys. An NRF performs network function authentication and authorization, network function selection, and network function security. An NSSF performs network slice selection per UE, network slice authorization per UE, and AMP reselection per UE.

Referring back to FIG. 6, RAN 111 and AMF 424 exchange attachment signaling for UE 401 that indicates the UE capability for MTC network slices. AMF 424 authenticates wireless UE 401 over RAN 411. AMF 424 selects MTC network slice 410 for UE 401 based on the reported UE capability. AMF 424 selects a corresponding DNN for UE 401 based on MTC network slice 410. AMF selects SMF 425 based on the DNN and MTC network slice 410. SMF 425 interacts with the NRF to select CHF 422, PCF 423, and SMF 425 for UE 401 based on the DNN and MTC network slice 410. SMF 425 interacts with the NRF to select UPF 412 and ASF 413 for UE 401 based on the DNN and MTC network slice 410. PCF 423 initially orders a data tunnel using a default non-GBR for UE 401 based on the DNN and MTC network slice 410. SMF 425 directs UPF 412 to serve the default data tunnel for UE 401 between RAN 411 and ASF 413 using the non-GBR. AMF 424 directs RAN 411 to serve the default data tunnel between UE 401 and UPF 412 using the non-GBR.

SMF 425 transfers tunnel status data that identifies UE 401 to NEF 421. Over a tunnel API, NEF 421 transfers the tunnel status data to the user data center along with options for tunnel HWT, QoS, and cost. Over the tunnel API, NEF 421 receives a selection of a HWT operation and an associated HWT cost. The HWT operation is to verify HWT of the default data tunnel. NEF 421 transfers the HWT cost to CHF 422. CHF 422 translates the HWT cost into a corresponding quota instruction and transfers the quota instruction to AMF 424. NEF 421 transfers the HWT operation to PCF 423. PCF 423 translates the HWT operation into a corresponding HWT instruction and transfers the HWT instruction to AMF 424. In response to the quota and HWT instructions, AMF 424 verifies HWT for ASF 413, UPF 412, RAN 411, and UE 401. To validate HWT, AMF 424 requests current HWT certificates from ASF 413, UPF 412, RAN 411, and UE 401. To obtain HWT certificates, UPF 412 and ASF 413 transfer RANDs to their CPUs which hash the RANDs with their secret HWT ID and return the results to UPF 412 and ASF 413. UPF 412 and ASF 413 transfer the hash results to a HWT authority that verifies the hashes and returns current HWT certificates. UPF 412 and ASF 413 transfer their HWT certificate to AMF 424. AMF 421 verifies the HWT certificates using the key from the HWT authority. AMF 424 transfers HWT status to NEF 421 which passes the HWT status to the user data center over the tunnel API. In some examples, the HWT authority comprises one of VNFs 605.

Over the tunnel API, NEF 421 receives a selection of an uplink QoS operation and an associated QoS cost. The uplink QoS operation is a heavy data burst from UE 401 to ASF 413. NEF 421 transfers the cost to CHF 422 which translates the cost into a corresponding quota instruction and transfers the quota instruction to SMF 425. NEF 421 transfers the QoS operation to PCF 423 which translates the QoS operation into a corresponding QoS instruction and transfers the QoS instruction to SMF 425. PCF 423 now orders the data tunnel to use an uplink burst Guaranteed Bit Rate (GBR). SMF 425 directs UPF 412 to serve the data tunnel for UE 401 between RAN 411 and ASF 413 using the uplink burst GBR. AMF 424 directs RAN 411 to serve the data tunnel for UE 401 between UE 401 and UPF 412 using the uplink burst GBR. The SDAP in RAN 411 transfers the application data to UPF 412 in MTC network slice 410 using the uplink burst GBR. In MTC network slice 410, UPF 412 transfers the application data to ASF 413 using the burst GBR QoS. SMF 425 transfers QoS status that characterizes the burst to NEF 421 which passes the QoS status to the user data center over the tunnel API.

Figure 8:
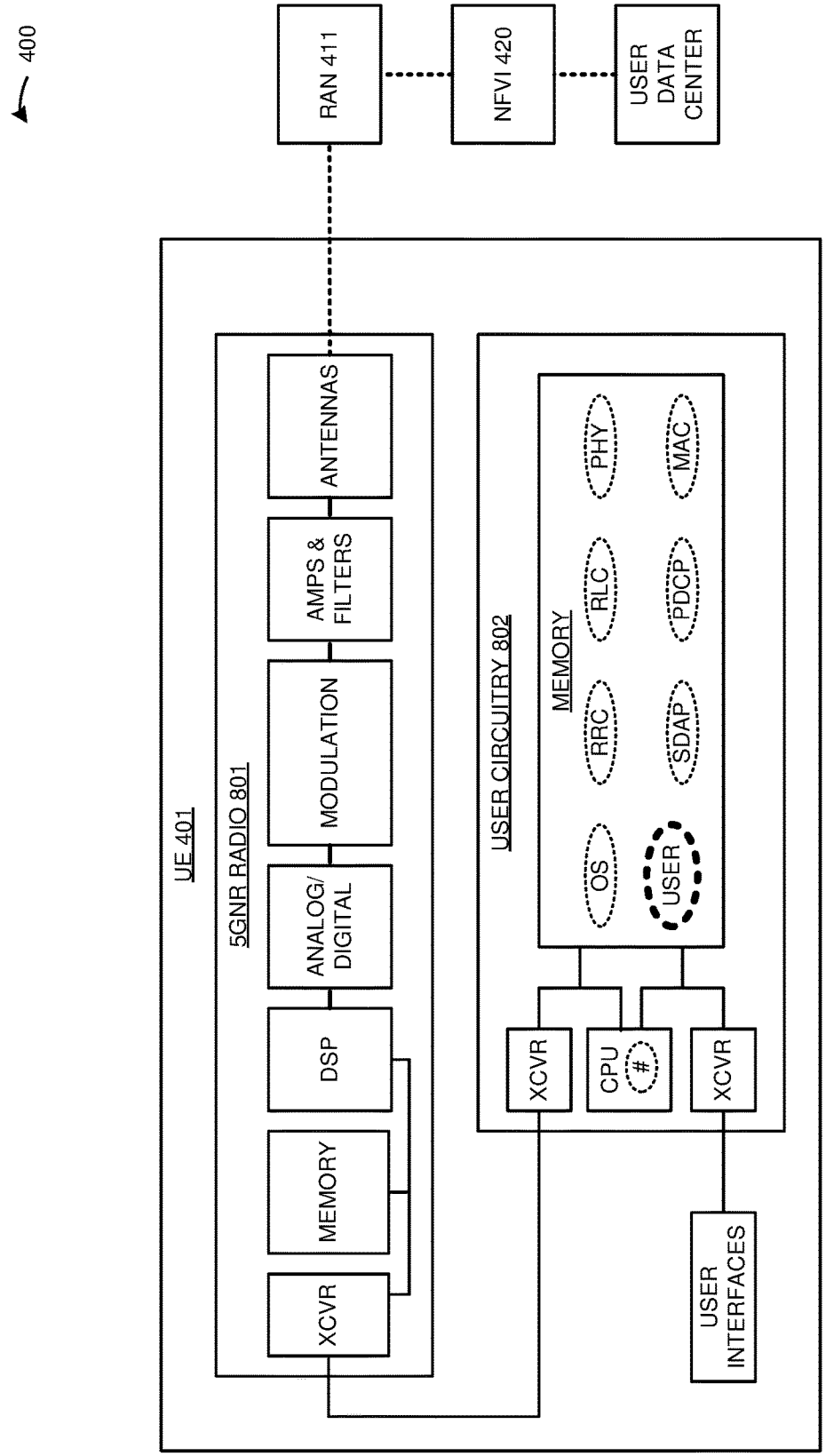
FIG. 8 illustrates the wireless UE that receives the uplink burst service over the MTC network slice.

FIG. 8 illustrates wireless UE 401 that receives the uplink burst service over MTC network slice 410. UE 401 comprises an example of UE 101, although UE 101 may differ. UE 401 comprises 5GNR radio 801 and user circuitry 802. 5GNR radio 801 comprises antennas, amplifiers, filters, modulation, analog-to-digital interfaces, DSP, memory, and transceivers that are coupled over bus circuitry. User circuitry 802 comprises memory, CPU, user interfaces, and transceivers that are coupled over bus circuitry. The memory in user circuitry 802 stores an operating system, low-latency applications (USER), and 5GNR network applications for PHY, MAC, RLC, PDCP, SDAP, and RRC. The antennas in 5GNR radio 801 are wirelessly coupled to RU 501 in RAN 411 over 5GNR links. Transceivers in 5GNR radio 801 are coupled to a transceiver in user circuitry 802. A transceiver in user circuitry 802 is typically coupled to the user interfaces like displays, controllers, memory, and the like. The CPU in user circuitry 802 executes the operating system, PHY, MAC, RLC, PDCP, SDAP, and RRC to exchange 5GNR signaling and data with RAN 411 over 5GNR radio 801.

In 5GNR radio 801, the antennas receive wireless signals from RAN 411 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to user circuitry 802 over the transceivers. In user circuitry 802, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the low-latency user applications. The 5GNR network applications process the new uplink 5GNR signaling and low-latency user data to generate corresponding uplink 5GNR symbols that carry the uplink 5GNR signaling and data. In 5GNR radio 801, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to RAN 411 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The RRC in UE 401 and the RRC in RAN 111 wirelessly exchange attachment signaling and the RRC in UE 401 reports a UE capability for MTC network slices. The RRC in RAN 411 directs the RRC in UE 401 to use the data tunnel to ASF 413 using the non-GBR. To obtain HWT certificates, the RRC in UE 401 transfers its RAND to the CPU which hashes the RAND with its secret HWT ID and returns the result to the RRC. The RRC transfers the hashes to a HWT authority that verifies the hashes and returns current HWT certificates. The RRC transfers the HWT certificate for UE 401 to AMF 424 over the N1. The RRC in RAN 411 directs the RRC in UE 401 to use the data tunnel to ASF 413 using the uplink burst GBR. The SDAP in UE 401 transfers application data to RAN 411 using the uplink burst GBR.

Figure 9:
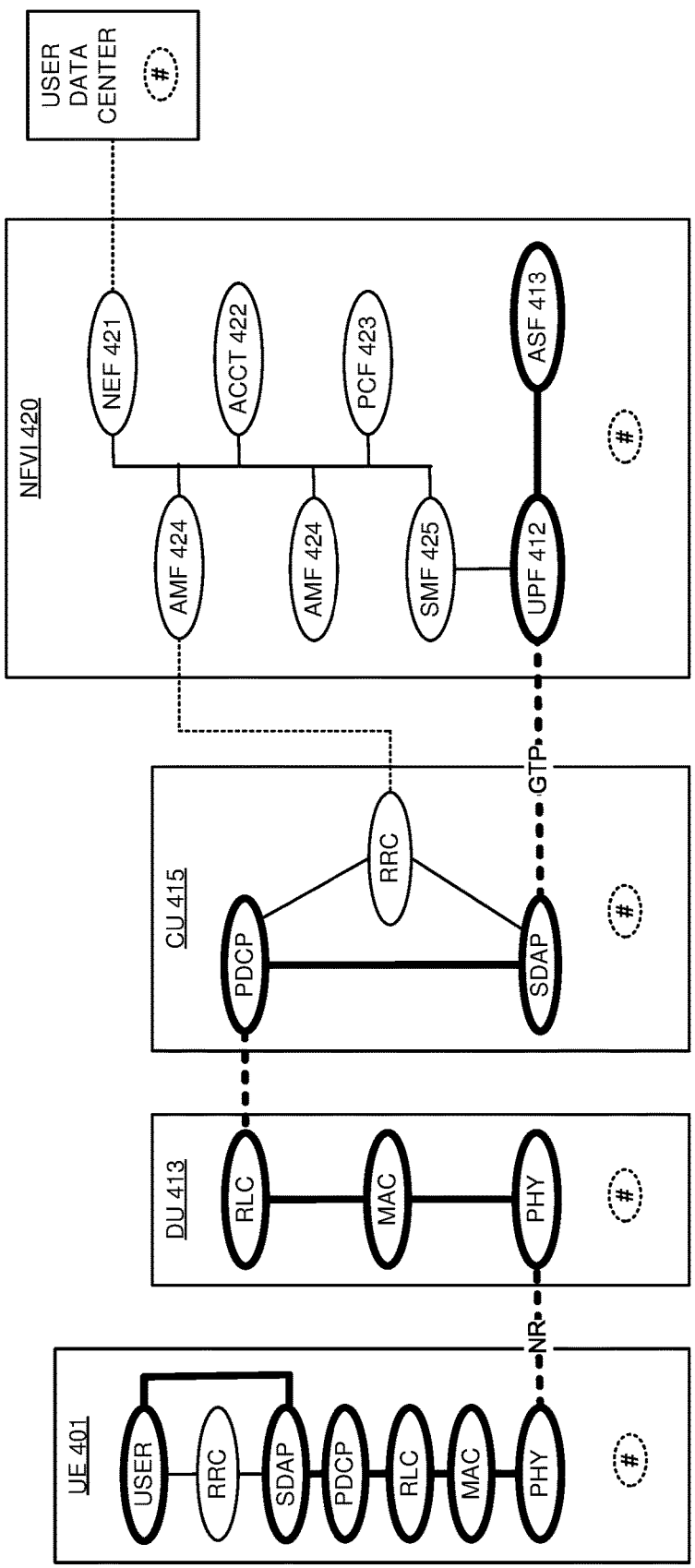
FIG. 9 illustrates the operation of the 5G network to deliver an uplink burst service to the wireless UE over the MTC network slice.

FIG. 9 illustrates the operation of 5G network 400 to deliver an uplink burst service to wireless UE 401 over MTC network slice 410. The operation is exemplary and may differ in other examples. The RRC in UE 401 and the RRC in CU 503 exchange attachment signaling and the RRC in UE 401 reports a UE capability for MTC network slices. The RRC in CU 503 and AMF 424 exchange attachment signaling for UE 401 that indicates the UE capability for MTC network slices. AMF 424 authenticates wireless UE 401 over RAN 411. AMF 424 selects MTC network slice 410 for UE 401 based on the reported UE capability. AMF 424 selects a DNN for UE 401 based on MTC network slice 410. AMF selects SMF 425 for UE 401 based on the DNN and MTC network slice 410. SMF 425 selects CHF 422 and PCF 423 for UE 401 based on the DNN and MTC network slice 410. SMF 425 selects UPF 412 and ASF 413 for UE 401 based on the DNN and MTC network slice 410. PCF 423 orders SMF 425 to establish a data tunnel between UE 401 and ASF 413 using a default non-GBR based on the DNN and MTC network slice 410. SMF 425 directs UPF 412 to serve the data tunnel for UE 401 between RAN 411 and ASF 413 using the default non-GBR. AMF 424 directs RAN 411 to serve the data tunnel between UE 401 and UPF 412 using the default non-GBR. RAN 411 directs UE 401 to use the data tunnel to ASF 413 using the default non-GBR.

SMF 425 transfers tunnel status data that identifies UE 401 to NEF 421. Over a tunnel API, NEF 421 transfers the tunnel status data to the user data center along with options for tunnel HWT, QoS, and cost. Over the tunnel API, NEF 421 receives a selection of a HWT operation and an associated HWT cost. The HWT operation is to verify HWT of the default data tunnel. NEF 421 transfers the HWT cost to CHF 422. CHF 422 translates the HWT cost into a corresponding HWT quota and transfers the HWT quota to AMF 425. NEF 421 transfers the HWT operation to PCF 423. PCF 423 translates the HWT operation into a corresponding HWT instruction and transfers the HWT instruction to AMF 424. In response to the HWT quota and instruction, AMF 424 verifies HWT for ASF 413, UPF 412, RAN 411, and UE 401. To validate HWT, AMF 424 requests current HWT certificates from ASF 413, UPF 412, RAN 411, and UE 401. To obtain certificates, ASF 413, UPF 412, RAN 411, and UE 401 transfer hashes of their secret HWT IDs to a HWT authority (not shown but possibly hosted by NFVI 420) that verifies the hashes and returns current HWT certificates to ASF 413, UPF 412, RAN 411, and UE 401. AMF 424 then receives the current HWT certificates from ASF 413, UPF 412, RAN 411, and UE 401. AMF 424 validates the HWT certificates using a key from the HWT authority. AMF 424 transfers HWT status to NEF 421 which passes the HWT status to the user data center over the tunnel API.

Over the tunnel API, NEF 421 receives a selection of an uplink QoS operation and an associated QoS cost. The uplink QoS operation is a heavy data burst from UE 401 to ASF 413. NEF 421 transfers the uplink cost to CHF 422 which translates the QoS cost into a corresponding QoS quota and transfers the QoS quota to SMF 425. NEF 421 transfers the QoS operation to PCF 423 which translates the QoS operation into a corresponding tunnel instruction and transfers the tunnel instruction to SMF 425. PCF 423 now orders the data tunnel to use a special uplink burst GBR QoS. SMF 425 directs UPF 412 to serve the data tunnel for UE 401 between RAN 411 and ASF 413 using the uplink burst GBR. AMF 424 directs RAN 411 to serve the data tunnel for UE 401 between UE 401 and UPF 412 using the uplink burst GBR. RAN 411 directs the RRC in UE 401 to use the default data tunnel to ASF 413 using the uplink burst GBR. The SDAP in UE 401 wirelessly transfers application data to the SDAP in CU 503 in RAN 411 using the uplink burst GBR. The SDAP in CU 503 in RAN 411 transfers the application data to UPF 412 in MTC network slice 410 in NFVI 420 using the uplink burst GBR. In MTC network slice 410 in NFVI 420, UPF 412 transfers the application data to ASF 413 using the uplink burst GBR. SMF 425 transfers QoS status that characterizes the burst to NEF 421 which passes the QoS status to the user data center over the tunnel API.

The wireless data network circuitry described above comprises computer hardware and software that form special-purpose network circuitry to deliver an uplink burst service to wireless UEs over MTC network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to deliver an uplink burst service to wireless UEs over MTC network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to deliver an uplink data service to a user application, the method comprising:

a controller network element exchanging signaling with a wireless user device over a Radio Access Network (RAN) and responsively establishing a data tunnel between the wireless user device and an application server over the RAN and at least one data network element;

an exposure network element transferring uplink Quality-of-Service (QoS) levels and corresponding service costs for the data tunnel, receiving a selection of one of the uplink QoS levels and a corresponding one of the service costs, indicating the one of the uplink QoS levels to a policy network element, and indicating the one of the service costs to a charging network element;

the policy network element receiving the indication of the one of the uplink QoS levels and indicating related tunnel instructions to the controller network element;

the charging network element receiving the indication of the one of the service costs indicating related quota instructions to the controller network element;

the controller network element directing the data network element to transfer application data over the data tunnel using the one of the uplink QoS levels responsive to the tunnel instructions and the quota instructions; and the data network element transferring application data over the data tunnel at the one of the uplink QoS levels.

2. The method of claim 1 wherein the exposure network element transferring the uplink QoS levels and the corresponding service costs for the data tunnel and receiving the selection of the one of the uplink QoS levels and the corresponding one of the service costs comprises at least one of a Network Exposure Function (NEF) and a Service Capability Exposure Function (SCEF) exposing third-party Application Programming Interfaces (APIs).

3. The method of claim 1 further comprising:
the exposure network element transferring a user hardware trust option for the data tunnel, receiving a selection of the user hardware trust option, and indicating the user hardware trust option to the policy network element;
the policy network element receiving the indication of the user hardware trust option and indicating related hardware trust instructions to the controller network element; and
the controller network element verifying hardware trust of at the wireless user device responsive to the related hardware trust instructions and based on a hardware trust code that is stored in a read-only memory in the wireless user device.

4. The method of claim 1 further comprising:
the exposure network element transferring a network hardware trust option for the data tunnel, receiving a selection of the network hardware trust option, and indicating the network hardware trust option to the policy network element;
the policy network element receiving the indication of the network hardware trust option and indicating related hardware trust information to the controller network element; and
the controller network element verifying hardware trust of the RAN, the data network element, and the application server responsive to the related hardware trust information and based on hardware trust codes that are stored in secure read-only memories in the RAN, the data network element, and the application server.

5. The method of claim 1 wherein the data network element comprises at least a portion of a Machine Type Communication (MTC) wireless network slice.

6. The method of claim 1 wherein the RAN comprises at least one of a Low-Power Wide Area Network (LP-WAN) and a Narrowband Internet-of-Things Wide Area Network (NB IoT WAN).

7. The method of claim 1 wherein the data network element comprises at least one of a User Plane Function (UPF), Serving Gateway (SGW), and Packet Data Network Gateway (PGW).

8. The method of claim 1 wherein the exposure network element comprises at least one of a Network Exposure Function (NEF) and a Service Capability Exposure Function (SCEF).

9. The method of claim 1 wherein the controller network element comprises at least one of an Access and Mobility Management Function (AMF), Session Management Function (SMP), and Mobility Management Entity (MME).

10. The method of claim 1 wherein the policy network element comprises at least one of a Policy Control Function (PCF) and a Policy, Charging, and Rules Function (PCRF).

11. A wireless communication system to deliver an uplink data service to a user application, the wireless communication system comprising:

a controller network element configured to exchange signaling with a wireless user device over a Radio Access Network (RAN) and responsively establish a data tunnel between the wireless user device and an application server over the RAN and at least one data network element;
an exposure network element configured to transfer uplink Quality-of-Service (QoS) levels and corresponding service costs for the data tunnel, receive a selection of one of the uplink QoS levels and a corresponding one of the service costs, indicate the one of the uplink QoS levels to a policy network element, and indicate the one of the service costs to a charging network element;
the policy network element configured to receive the indication of the one of the uplink QoS levels and indicate related tunnel instructions to the controller network element;
the charging network element configured to receive the indication of the one of the service cost levels indicating related quota instructions to the controller network element;
the controller network element configured to direct the data network element to transfer application data over the data tunnel using the one of the uplink QoS levels responsive to the tunnel instructions and the quota instructions; and
the data network element configured to transfer application data over the data tunnel at the one of the uplink QoS levels.

12. The wireless communication system of claim 11 wherein the exposure network element comprises at least one of a Network Exposure Function (NEF) and a Service Capability Exposure Function (SCEF) configured to transfer the uplink QoS levels and the corresponding service costs for the data tunnel and receive the selection of the one of the uplink QoS levels and the corresponding one of the service costs by exposing third-party Application Programming Interfaces (APIs).

13. The wireless communication system of claim 11 further comprising:
the exposure network element configured to transfer a user hardware trust option for the data tunnel, receive a selection of the user hardware trust option, and indicate the user hardware trust option to the policy network element;
the policy network element configured to receive the indication of the user hardware trust option and indicate related hardware trust instructions to the controller network element; and
the controller network element configured to verify hardware trust of at the wireless user device responsive to the related hardware trust instructions and based on a hardware trust code that is stored in secure read-only memory in the wireless user device.

14. The wireless communication system of claim 11 further comprising:
the exposure network element configured to transfer a network hardware trust option for the data tunnel, receive a selection of the network hardware trust option, and indicate the network hardware trust option to the policy network element;
the policy network element configured to receive the indication of the network hardware trust option and indicate related hardware trust instructions to the controller network element; and the controller network element configured to verify hardware trust of the RAN, the data network element, and the application server responsive to the related hardware trust instructions and based on hardware trust codes that are stored in secure read-only memories in the RAN, the data network element, and the application server.

15. The wireless communication system of claim 11 wherein the data network element comprises at least a portion of a Machine Type Communication (MTC) wireless network slice.

16. The wireless communication system of claim 11 wherein the RAN comprises at least one of a Low-Power Wide Area Network (LP-WAN) and a Narrowband Internet-of-Things Wide Area Network (NB IoT WAN).

17. The wireless communication system of claim 11 wherein the data network element comprises at least one of a User Plane Function (UPF), Serving Gateway (SGW), and Packet Data Network Gateway (PGW).

18. The wireless communication system of claim 11 wherein the exposure network element comprises at least one of a Network Exposure Function (NEF) and a Service Capability Exposure Function (SCEF).

19. The wireless communication system of claim 11 wherein the controller network element comprises at least one of an Access and Mobility Management Function (AMP), Session Management Function (SMP), and Mobility Management Entity (MME).

20. The wireless communication system of claim 11 wherein the policy network element comprises at least one of a Policy Control Function (PCF) and a Policy, Charging, and Rules Function (PCRF).

\* \* \* \* \*